United States Patent
Hanes, Jr.

(10) Patent No.: US 7,299,871 B2
(45) Date of Patent: Nov. 27, 2007

(54) SEALING COMPOSITIONS AND ASSOCIATED METHOD OF USE

(75) Inventor: Robert E. Hanes, Jr., Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 389 days.

(21) Appl. No.: 10/920,108

(22) Filed: Aug. 17, 2004

(65) Prior Publication Data
US 2006/0037753 A1   Feb. 23, 2006

(51) Int. Cl.
E21B 33/13 (2006.01)
(52) U.S. Cl. .................. 166/295; 166/300
(58) Field of Classification Search .......... 166/295, 166/300
See application file for complete search history.

(56) References Cited

U.S. PATENT DOCUMENTS

| | | | |
|---|---|---|---|
| 3,251,414 A * | 5/1966 | Willman | 166/295 |
| 5,082,057 A | 1/1992 | Sydansk | 166/295 |
| 5,335,726 A * | 8/1994 | Rodrigues | 166/295 |
| 6,209,646 B1 * | 4/2001 | Reddy et al. | 166/300 |
| 6,448,206 B1 * | 9/2002 | Griffith et al. | 507/219 |
| 6,667,279 B1 | 12/2003 | Hessert et al. | 507/225 |
| 6,939,833 B2 * | 9/2005 | Burts, III | 507/225 |

OTHER PUBLICATIONS

U.S. Appl. No. 10/778,465, filed Feb. 14, 2004, Echols et al.

* cited by examiner

Primary Examiner—David Bagnell
Assistant Examiner—Nicole Coy
(74) Attorney, Agent, or Firm—Robert A. Kent; Fletcher, Yoder & Someren

(57) ABSTRACT

The present invention relates to sealing compositions and associated methods. In one embodiment, the present invention provides sealing compositions that comprise a viscous liquid polymer and a monomer comprising a vinyl monomer or an activated vinyl monomer. In other embodiments, the present invention is directed to methods of forming a seal in a subterranean formation using a sealing composition of the present invention.

60 Claims, 2 Drawing Sheets

SEALING COMPOSITIONS AND ASSOCIATED METHOD OF USE

BACKGROUND

The present invention relates to sealing compositions and associated methods. More particularly, the present invention relates to sealing compositions that comprise a viscous liquid polymer and a monomer comprising a vinyl monomer or an activated vinyl monomer and associated methods.

Sealing compositions are commonly used in subterranean and surface operations. Sealing compositions may be used at any stage during the life of a well and for a variety of reasons, such as to provide zonal isolation or to seal a lost circulation zone. For example, a sealing composition may be placed into a desired location in a subterranean formation and allowed to form a substantially impermeable barrier therein. This barrier may act, inter alia, to form a seal that prevents the undesirable migration of fluids within a chosen portion of a subterranean formation. For example, the sealing composition may be used to isolate various sections of a subterranean formation by forming an annular seal or barrier between tubing and well casing or the well bore wall in an open-hole completion. In some instances, the sealed zone may be a water-producing zone, whereby the seal formed therein isolates the water-producing zone from any produced hydrocarbons. In addition, sealing compositions also may be used to plug cracks and/or holes in pipe strings.

Conventional sealing compositions may comprise cement compositions or water-based or oil-based polymeric systems. Cement compositions primarily are used in primary cementing operations to cement pipe strings into a well bore and in remedial cementing operations, such as squeeze or plug cementing. The use of conventional cement compositions, however, may be problematic. For instance, typical cement compositions comprising cementitious materials, such as Portland cement, slag cement, or pozzolana, are soluble in acid. While their acid solubility may be slow, cement compositions generally will dissolve in flowing acid streams, such as those that may be encountered during subterranean operations. Further, because these cement compositions are generally pumped into their desired location within the subterranean formation, problems may be encountered due to difficulty in placing the cement composition into the appropriate location. Depending on a variety of factors, cement compositions also may form microfissures or microfractures that reduce sealing ability thereof. Conventional water-based or oil-based polymeric systems generally may be used, inter alia, to isolate zones in a subterranean formation. Similar to the problems with cement compositions, problems also may be encountered in placing these polymeric systems into the appropriate location within the subterranean formation, for example, because they typically are pumped into place from the surface.

SUMMARY

The present invention relates to sealing compositions and associated methods. More particularly, the present invention relates to sealing compositions that comprise a viscous liquid polymer and a monomer comprising a vinyl monomer or an activated vinyl monomer and associated methods.

In one embodiment, the present invention provides a sealing composition that comprises a viscous liquid polymer and a monomer comprising a vinyl monomer or an activated vinyl monomer.

In another embodiment, the present invention provides a method of forming a seal in a subterranean formation that comprises providing a sealing composition that comprises a viscous liquid polymer and a monomer comprising a vinyl monomer or an activated vinyl monomer; placing the sealing composition into a desired location in the subterranean formation; and allowing the sealing composition to set to form a seal.

In another embodiment, the present invention provides a method of forming a seal in a subterranean formation penetrated by a well bore that comprises providing a sealing composition that comprises a viscous liquid polymer and a monomer comprising a vinyl monomer or an activated vinyl monomer; activating polymerization of the sealing composition; placing the sealing composition into a desired location in the subterranean formation; and allowing the sealing composition to polymerize to form a seal.

The features and advantages of the present invention will be readily apparent to those skilled in the art upon a reading of the description that follows.

BRIEF DESCRIPTION OF THE DRAWINGS

A more complete understanding of the present disclosure and advantages thereof may be acquired by referring to the following description taken in conjunction with the accompanying drawings, wherein.

Figure 1:
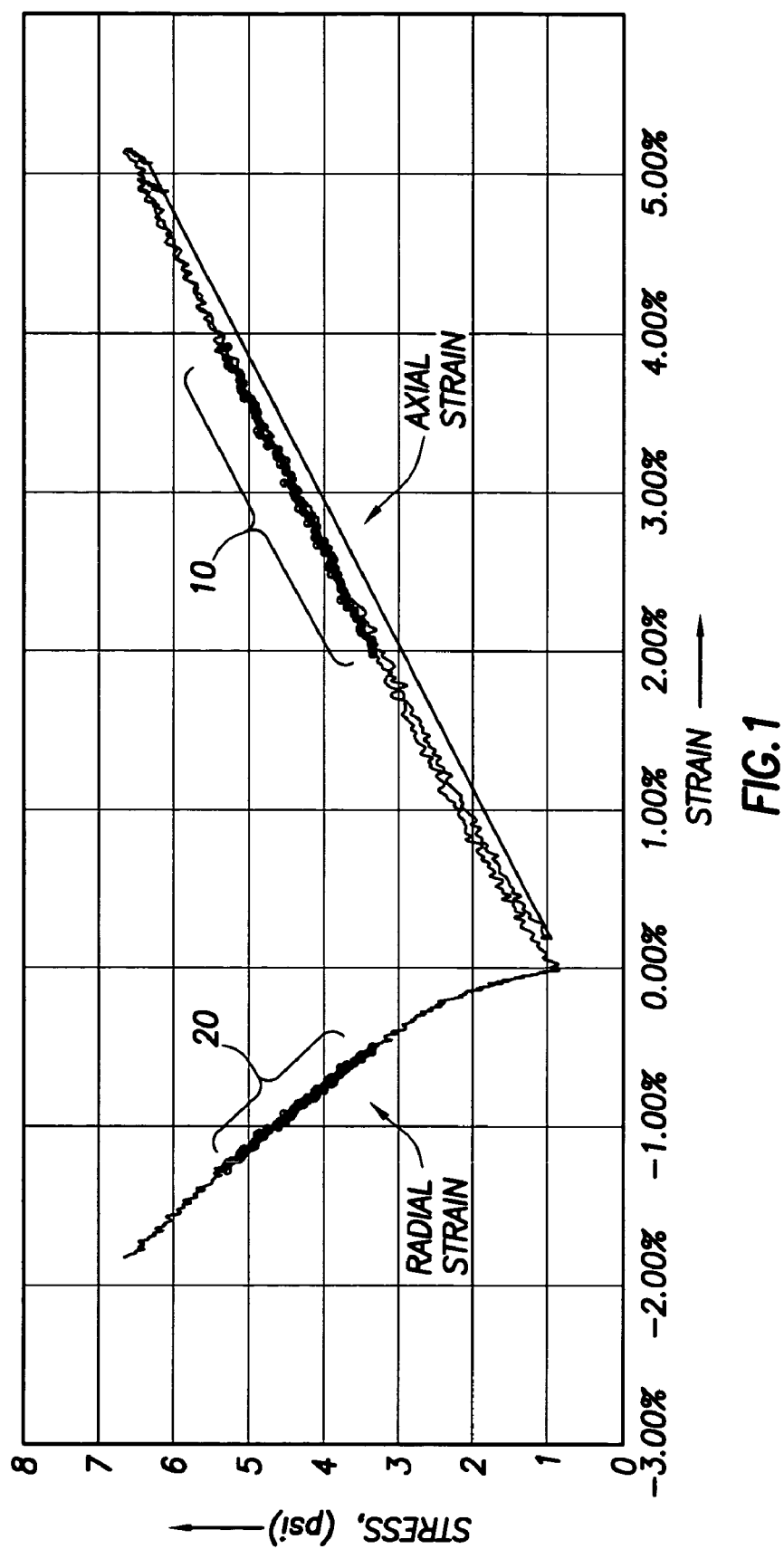
FIG. 1 is a graphical representation of a stress-strain curve for an example sealing composition of the present invention.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates to sealing compositions and associated methods. More particularly, the present invention relates to sealing compositions that comprise a viscous liquid polymer and a monomer comprising a vinyl monomer or an activated vinyl monomer and associated methods. The methods of compositions of the present invention are suitable for use in both surface and subterranean operations.

While the compositions and methods of the present invention are useful in a variety of operations where it is desirable to form a seal in a subterranean formation (e.g., to seal casing leaks, to seal water-producing zones, etc.), they are particularly useful for sealing the annular space between a section of tubing in a well bore and a wall of the well bore or casing. In some embodiments, the seal is a permanent seal. As used herein, the phrase "permanent seal" is defined to mean a seal formed by a substantially impermeable hardened mass that is substantially chemically inert, whereby removal is possible primarily through the use of an appropriate destructive mechanical device. In some embodiments, the sealing compositions of the present invention may be placed into the annular space between a section of tubing in a well bore and a wall of the well bore or casing to form a seal in combination with external elastomeric rings, sleeves, and the like, carried on the tubing. Examples of forming suitable annular isolators are provided in U.S. application Ser. No. 10/778,465, filed on Feb. 13, 2004, the relevant disclosure of which is incorporated herein by reference.

The sealing compositions of the present invention generally comprise a viscous liquid polymer and a monomer comprising a vinyl monomer or an activated vinyl monomer. Optionally, the sealing compositions further may comprise organosilane compounds, crosslinkers, solid additives, activators, and/or stabilization compounds. Generally, the setting process of the sealing compositions may be chemically activated, mechanically activated by appropriate mechanical force, or a combination of mechanical and chemical activation. Chemical activation may occur with or without an activator. In some embodiments, where there is a combination of mechanical and chemical activation, the mechanical force may activate suitable activators that are included in the sealing compositions. When activated, the sealing compositions of the present invention set to form a substantially impermeable hardened mass that is generally stable at hostile conditions, such as high temperatures, high pressures, and corrosive acidic or caustic oil, gas, or water well environments. In certain embodiments, the setting process of the sealing compositions of the present invention involves free radical polymerization. According to the methods of the present invention, the resultant hardened mass may be used to form seals in a desired location in a subterranean formation as desired by one of ordinary skill in the art.

The viscous liquid polymer that can be utilized in the sealing compositions of the present invention may be any liquid polymer that possesses suitable functional groups that can form an effective crosslink either as an acceptor, or a donor, including, but not limited to, functional groups such as alkenes, alkynes, epoxides, and aziridines. The viscous liquid polymer may have a molecular weight in the range of from about 1,000 to about 1,000,000. Among other things, the viscous liquid polymer should have a viscosity sufficient to enable the sealing composition to be placed into the appropriate location within the subterranean formation. And, in some embodiments, the viscous liquid polymer should have sufficient viscosity to displace any fluids (e.g., completions fluids) from the desired location for the seal. In one instance, this might be so that the seal is between the formation and the rubber or steel of the tubular member in a well bore. In certain of these embodiments, the viscosity of the viscous liquid polymer should be at least about 3 times the viscosity of the fluid to be displaced. Generally, the viscous liquid polymer should have a viscosity in the range of from about 100 centipoise to about 600 Poise.

Polymers suitable for use as the viscous liquid polymers in the present invention include, but are not limited to, polybutadiene, polybutadiene(cis), polybutadiene (epoxy/hydroxyl functionalized), polybutadiene (hydroxyl terminated), polybutadiene-graft-poly (methyl acrylate-co-acrylonitrile), polybutadiene (dicarboxy terminated), and combinations thereof. The viscous liquid polymer is included in a sealing composition of the present invention in an amount sufficient to form the desired permanent seal. In some embodiments, the viscous liquid polymer is included in a sealing composition of the present invention in an amount in the range of from about 40% to about 95% by weight of the sealing composition, and, in other embodiments, in an amount in the range of from about 60% to about 75% by weight of the sealing composition.

Any monomer comprising a vinyl monomer or an activated vinyl monomer may be used in the present invention. In some embodiments, the monomer comprises at least one derivative of acrylic acid. Such monomers include, but are not limited to, acrylic acid, sodium salt, 2-hydroxyethyl acrylate, acrylamide, methylacrylamide, N,N dimethylacrylamide, n-isopropyl acrylamide, methyl methacrylate, alkyl acrylates, aryl acrylates, methyl acrylates, derivatives of methyl acrylates including acrylamides, and combinations thereof. Suitable monomers may be provided in either solid or liquid form. The monomer comprising a vinyl monomer or an activated vinyl monomer is included in a sealing composition of the present invention in an amount sufficient to form the desired permanent seal. In some embodiments, the monomer is included in a sealing composition of the present invention in an amount in the range of from about 2% to about 60% by weight of the sealing composition, and, in other embodiments, in an amount in the range of from about 3% to about 20% by weight of the sealing composition. In some embodiments, combinations of monomers comprising a vinyl monomer or an activated vinyl monomer may be included in the sealing compositions. For example, a monomer comprising one acrylate group and a second monomer comprising more than one acrylate group may be included in the sealing composition, wherein the second monomer comprising more than one acrylate group, inter alia, provides thermal stability to the resultant permanent seal. In some embodiments, the second monomer may comprise two acrylate groups, e.g., 2-hydroxyethyl acrylate.

The use of an organosilane compound is optional, but may be included in the sealing compositions of the present invention, inter alia, to impart high metal pipe surface and formation surface bond strengths to the sealing compositions of the present invention. Additionally, an organosilane compound may be included in the sealing compositions of the present invention as a water-sensitive catalyst so that polymerization of the sealing composition may be initiated upon contact with aqueous fluids present in the formation. Generally, the organosilane compounds used in the present invention may be mono-, di-, tri-, or polyfinctional organosilanes. Suitable organosilane compounds include tris(3-trimethoxysilylpropyl)isocyanurate, 3-aminopropyltrimethyoxysilane, 3-aminopropyltriethoxysilane, N-2-(aminoethyl)-3-ammopropyltriethoxysilane, 3-glycidoxypropyltrimethoxysilane, and combinations thereof. The organosilane compound may be included in a sealing composition of the present invention in an amount capable of imparting the desired bond strength. In some embodiments, the organosilane compound may be included in a sealing composition of the present invention in an amount in the range of from about 1% to about 40% by weight of the sealing composition, and, in other embodiments, in an amount in the range of from about 2.5% to about 20% by weight of the sealing composition.

The sealing compositions of the present invention further may comprise polyfunctional crosslinkers. As those of ordinary skill in the art may appreciate, polyfunctional crosslinkers include difunctional crosslinkers, trifunctional crosslinkers, tetrafunctional crosslinkers, pentafunctional crosslinkers, and variations thereof. Examples of suitable crosslinkers include, but are not limited to, trimethylolpropane ethoxylate triacrylate, or tris(2-hydroxyethyl) isocyanurate triacrylate. An example of a suitable tris(2-hydroxyethyl) isocyanurate triacrylate is commercially available under the trade designation "SR368D" from Sartomer Company, Inc., Exton, Pa., as a 30% solution in a trimethylpropane ethoxylate triacrylate ester mixture. The use of polyfunctional crosslinkers is optional but may be included in the sealing compositions of the present invention, inter alia, to form a tighter polymeric matrix, thereby increasing long-term stability of the resultant seal. In some embodiments, the polyfunctional crosslinkers may be included in a sealing composition of the present invention in an amount in the range of from about 2% to about 30% by weight of the sealing composition, and, in other embodiments, in an amount in the range of from about 5% to about 15% by weight of the sealing composition.

Optionally, solid additives also may be included in the sealing compositions of the present invention, inter alia, to provide structural rigidity to the sealing composition under high-temperature conditions. These solid additives may be either organic or inorganic solids. Examples of suitable solid additives include, but are not limited to, surface-activated polybutadiene and glass particles. In some embodiments, the solid additives may be included in a sealing composition of the present invention in an amount in the range of from about 1% to about 10% by weight of the sealing composition, and more preferably in an amount in the range of from about 2% to about 8% by weight of the sealing composition.

Use of an activator in the sealing compositions is optional and may be used to activate or facilitate the activation of the polymerization of the sealing compositions. Inclusion of the activator is optional because it is believed that, in some instances, activation of the polymerization of the sealing composition occurs without the necessity of an activator (e.g., when mechanical activation forces or downhole conditions are sufficient to activate polymerization). Where used, the activators generally form radicals in the sealing compositions, wherein the radicals act, inter alia, to activate polymerization of the sealing composition. Examples of compounds suitable for use as the activator include, but are not limited to, peroxides, peroxy carbonates, azides, azo activators, or mixtures thereof. Examples of activators include 2,2'-azobis(2-imidazole-2-hydroxyethyl) propane, 2,2'-azobis(2-aminopropane), 4,4'-azobis (4-cyanovaleric acid), 2,2'-azobis(2-methyl-N-(2-hydroxyethyl) propiona-mide, t-butyl peroxide, t-butylhydroperoxide, and mixtures thereof. It is within the ability of one of ordinary skill in the art, with the benefit of this disclosure, to know the appropriate amount and type of activator to include in the sealing composition based on a number of factors, including down-hole temperatures and storage life.

Generally, the activator should not activate the polymerization of the sealing compositions until the desired time. In some embodiments, the activators may be selected for reactivity at a preselected temperature such that the activators are inactive until that temperature is reached. In these embodiments, mechanical activation may provide sufficient force such that the temperature of the activator is raised above the preselected temperature. In certain embodiments, the activators may be selected for reactivity at a preselected temperature of at least about 170° C., such as t-butyl peroxide, which is commercially available as "HT BREAKER™" additive from Halliburton Energy Services, Duncan, Okla. In other embodiments, the activators may be selected for reactivity at the conditions present in the subterranean formation. In yet other embodiments, the activators may be at least somewhat delayed by encapsulation, where the activator is contained within an encapsulating material. A wide variety of conventional encapsulation techniques may be suitable for use in the present invention. In some embodiments, the encapsulating material may be a polymeric micelle that may comprise an amphiphilic block copolymer comprising a hydrophilic component and a hydrophobic component. These encapsulated activators may be included in the sealing compositions of the present invention. In some embodiments, the encapsulated activators, such as the glass ampoules containing the activators, may be attached to an inner surface in a compartment of the downhole tool that will deliver the sealing composition downhole. Among other things, the encapsulation technique chosen may involve a shear-sensitivity delivery mechanism such that the encapsulated activators are stable when in the sealing composition and only release the activators into the sealing composition under the mechanical forces applied to them by mechanical activation. Selection of an appropriate encapsulation technique should be based on the desired application and is within the ability of one of ordinary skill in the art with the benefit of this disclosure. In these encapsulated embodiments, the activators generally may be selected for reactivity at the conditions present in the subterranean formation.

Even further, in some embodiments, the sealing composition may further comprise a stabilization compound. The stabilization compound may be used, inter alia, to further stabilize the activators so that the activators do not prematurely form radicals until the desired time. In certain embodiments, the stabilization compound may be encapsulated with the activator within the encapsulating material so that the encapsulating material contains an activator and a stabilization compound. Examples of suitable stabilization compounds include, but are not limited to, monomethyl ether hydroquinone. One of ordinary skill in the art, with the benefit of this disclosure, will be able to determine the appropriate amount and type of a stabilization compound to use for a particular application based, inter alia, on the activator chosen, downhole temperatures, and storage life.

Generally, the sealing compositions of the present invention may be placed into the subterranean formation in the desired location for the seal. In some embodiments, the sealing composition may be delivered downhole and placed into the desired location via a downhole tool. The downhole tool may include a reservoir or a storage tank that is capable of carrying the sealing composition of the present invention downhole. Even further, in some embodiments, an inert environment may be provided for the sealing composition in the reservoir or storage tank of the downhole tool, for example, by surrounding the sealing composition with a nitrogen blanket. Examples of suitable apparatus that may be adapted for use in the present invention are provided in U.S. application Ser. No. 10/778,465, filed on Feb. 15, 2004, the relevant disclosure of which is incorporated herein by reference.

As previously mentioned, the setting process of the sealing compositions of the present invention may be chemically activated, mechanically activated, or a combination thereof. Where the setting process is chemically activated, an activator may or may not be advisable for the setting process to occur. For example, in some embodiments, the sealing composition may be designed so that the setting process occurs at conditions present in the subterranean formation without the need for an activator. In other embodiments, the sealing composition may include an activator. In some embodiments, the activator may be selected for reactivity at the conditions present within the subterranean formation. It generally is desired that the activator not activate the setting process of the sealing composition until the appropriate time so the permanent seal may be formed in the appropriate location within the subterranean formation. In some embodiments, this may be accomplished by including a stabilization compound in the sealing composition of the present invention. In other embodiments, the sealing composition may be contacted with the activator when desired to activate the setting process of the sealing composition. This contact may occur immediately prior to, simultaneously with, or after the placement of the sealing composition in the appropriate location in the subterranean formation. If contact between the activator and the sealing composition occurs prematurely, activation of the setting process may occur, whereby the sealing composition may set to form a permanent seal in an undesired location. To accomplish contact of the sealing composition with the activator at the desired time, the sealing composition and the activator may be independently delivered to the appropriate location. In some embodiments, the sealing composition and the activator may be delivered to the appropriate location in separate compartments (e.g., a reservoir or a storage tank) of a downhole tool. By appropriate design of the downhole tool, the sealing composition and the activator may be mixed and delivered to the location where a permanent seal may be needed. It is within the ability of one of ordinary skill in the art, with the benefit of this disclosure, to select and implement the appropriate technique so that contact between the sealing composition and the activator occurs as desired.

According to the methods of the present invention, the setting process of the sealing compositions also may be mechanically activated by applying appropriate mechanical force to the sealing compositions. Generally, the mechanical force should be sufficient to activate the polymerization of the sealing compositions of the present invention. In some embodiments, mechanical and chemical activation may be combined so that the mechanical force applied to the sealing composition may be sufficient to activate polymerization by releasing the encapsulated activators that may be contained in the sealing compositions. For example, the mechanical force may be sufficient to rupture polymeric micelles or glass ampoules that contain the activators, thereby releasing the activators into the sealing composition, which, in turn, activate the polymerization of the sealing composition. In other embodiments, the mechanical force may provide sufficient energy, e.g., in the form of heat, to the sealing compositions that is needed to activate the setting process. In these embodiments, the mechanical force may provide sufficient energy to the sealing composition to activate the polymerization of the sealing composition without the necessity for an activator. However, in other embodiments where mechanical and chemical activation is combined, an activator that is selected to activate the polymerization of the sealing composition above a preselected temperature may be included in the sealing composition. In these embodiments, the energy provided by the mechanical forces activates the activator by raising the temperature of the sealing composition above this preselected temperature.

A wide variety of methods may be used to apply the appropriate mechanical forces to the sealing compositions, inter alia, to rupture the micelles or glass ampoules, activate polymerization, or activate the activators. In some embodiments, the mechanical forces may be applied by the expansion or stroke of a downhole tool where the sealing composition is contained within a compartment of the downhole tool. The mechanical forces may be sufficient to detach the glass ampoules attached to inner surfaces of the compartment, if present and so attached. Furthermore, the mechanical force may be sufficient to force the sealing composition from the compartment of the downhole tool, through an orifice in connection with the compartment, to the desired location for the permanent seal. By appropriate design of the orifice, it is believed that sufficient energy may be generated by application of the mechanical force to the sealing composition. For example, as the sealing composition passes through the orifice it will be subjected to pressure and shear forces sufficient for mechanical activation. In some embodiments, the pressure and shear forces are sufficient to rupture the micelles or glass ampoules. In other embodiments, the pressure and shear forces may be sufficient to increase the temperature of the sealing composition to activate polymerization, e.g., by activating the activators or by activating polymerization without the necessity for activators. This orifice may be part of a pressure relief valve that is set at a preselected pressure. Generally, the pressure relief valve may be set at a preselected pressure so that sufficient energy may be generated for mechanical activation as the sealing composition passes therethrough. In some embodiments, the pressure relief valve may be set at a preselected pressure of at least about 1,200 psi so that sufficient energy may be generated for mechanical activation. It is within the ability of one of ordinary skill in the art with the benefit of this disclosure to select and implement the appropriate means for applying the mechanical force.

In one embodiment, the present invention provides a sealing composition that comprises a viscous liquid polymer and a monomer comprising a vinyl monomer or an activated vinyl monomer. An example of a sealing composition of the present invention comprises 71.4% polybutadiene epoxy/hydroxyl finctionalized by weight, 14.3% 2-hydroxyethyl acrylate by weight, 7.1% trimethylpropane ethoxylate triacrylate by weight, 3.6% acrylamide by weight, and 3.6% tris(3-trimethyloxysilylpropyl)isocyanurate by weight. Another example of a sealing composition of the present invention comprises 60.6% polybutadiene epoxy/hydroxyl functionalized by weight, 15.2% N,N-dimethylacrylamide by weight, 21.2% tris(2-hydroxyethyl)isocyanurate triacrylate by weight as a 30% solution in trimethylpropane ethoxylate triacrylate ester, and 3% tris(3-trimethyloxysilylpropyl)isocyanurate by weight.

In another embodiment, the present invention provides a method of forming a seal in a subterranean formation that comprises providing a sealing composition that comprises a viscous liquid polymer and a monomer comprising a vinyl monomer or an activated vinyl monomer; placing the sealing composition into a desired location in the subterranean formation; and allowing the sealing composition to set to form a seal.

In another embodiment, the present invention provides a method of forming a seal in a subterranean formation penetrated by a well bore that comprises providing a sealing composition that comprises a viscous liquid polymer and a monomer a vinyl monomer or an activated vinyl monomer; activating polymerization of the sealing composition; placing the sealing composition into a desired location in the subterranean formation; and allowing the sealing composition to polymerize to form a seal. In some embodiments, activating polymerization of the sealing composition may occur prior to, subsequent to, or simultaneously with placing the sealing composition into the desired location.

To facilitate a better understanding of the present invention, the following examples of specific embodiments are given. In no way should the following examples be read to limit, or define, the scope of the invention.

EXAMPLE 1

This example was performed utilizing the following procedure. A sample composition of the present invention was prepared and placed into a plastic casting device. Next, the temperature of the sample composition was slowly raised to 170° F. for 12 hours. Subsequently, the sample composition was cooled to room temperature and observed. The sample was observed to resist concentrated acid, base, and organic solvents with time. The below-listed samples were prepared and tested according to this procedure.

Sample Composition No. 1 comprised 71.4% polybutadiene epoxy/hydroxyl finctionalized by weight, 14.3% 2-hydroxyethyl acrylate by weight, 7.1% trimethylpropane ethoxylate triacrylate by weight, 3.6% acrylamide by weight, and 3.6% tris(3-trimethyloxysilylpropyl) isocyanurate by weight. Sample Composition No. 1 set to form a hardened mass that was substantially impermeable.

Sample Composition No. 2 comprised 60.6% polybutadiene epoxy/hydroxyl functionalized by weight, 15.2% N,N-dimethylacrylamide by weight, 21.2% tris(2-hydroxyethyl) isocyanurate triacrylate by weight as a 30% solution in trimethylpropane ethoxylate triacrylate ester, and 3% tris(3-trimethyloxysilylpropyl)isocyanurate by weight. Sample composition No. 2 set to form a hardened mass that was substantially impermeable.

EXAMPLE 2

The mechanical properties of set Sample Composition No. 1 were determined, including ultimate compressive strength, Poisson's Ratio, and Young's Modulus. Young's Modulus is an elastic constant that represents the relationship of an applied stress to the resultant strain for a material. The Poisson's Ratio is the ratio of transverse contraction strain to longitudinal extension strain in the direction of stretching force for a material.

Figure 2:
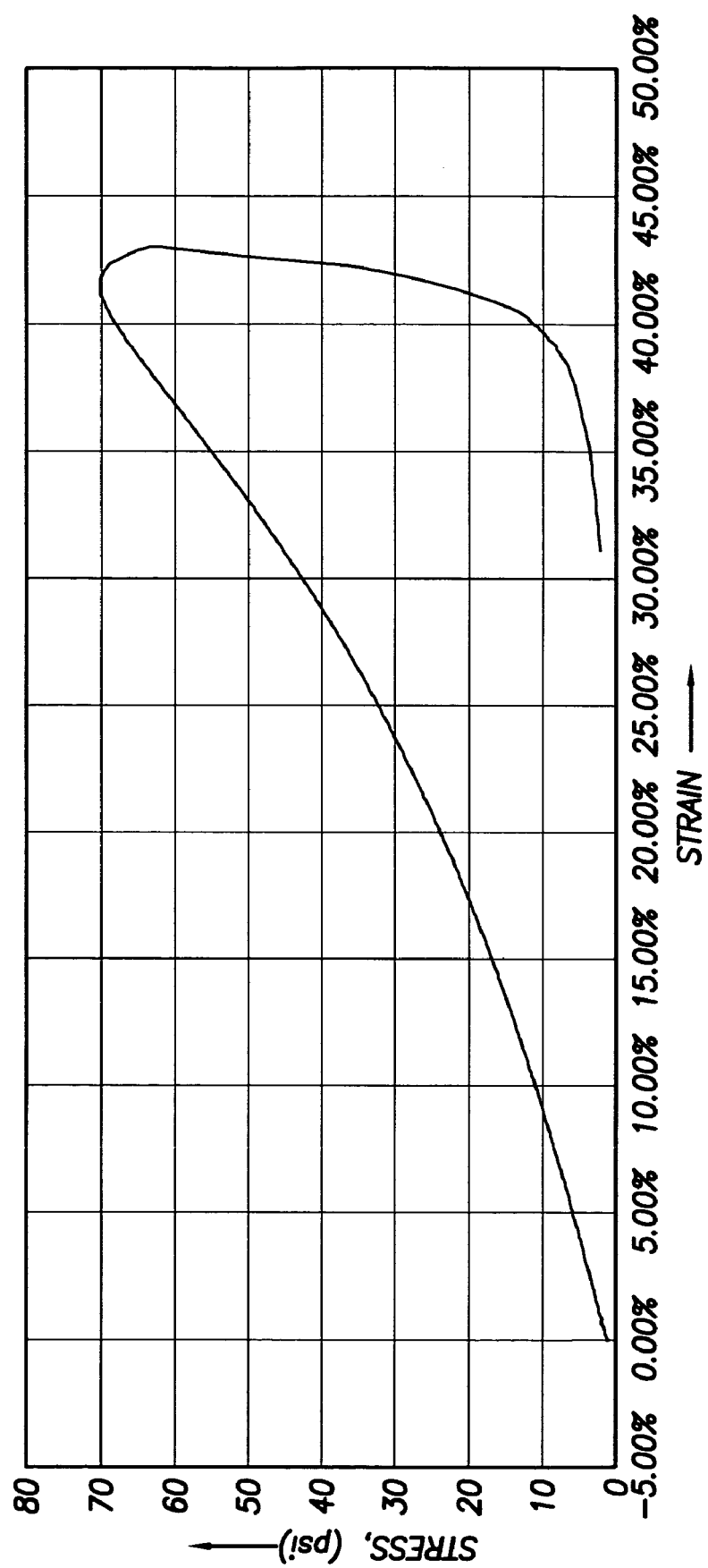
FIG. 2 is a graphical representation of a stress-strain curve for an example sealing composition of the present invention developed during a determination of ultimate compressive strength.

Accordingly, compression testing was done utilizing a two inch diameter by four inch length cylinder of the material to generate FIG. 1 and FIG. 2. FIG. 1 is a graphical representation of a stress-strain curve for set Sample Composition No. 1. The Young's Modulus was calculated in the region indicated on FIG. 1 by the number 10. The Young's Modulus was determined to be 105 pounds per square inch ("psi"). The Poisson's ratio was calculated in the regions indicated on FIG. 1 by the numbers 10 and 20. The Poison's ratio was determined to be 0.39. FIG. 2 is a graphical representation of the stress-strain curve developed during compressions tests performed to determine the ultimate compressive strength for set Sample Composition No. 1. The ultimate compressive strength was determined to be 70 psi at 40% axial deformation.

The Young's Modulus, Poisson's ratio, and ultimate compressive strength for Sample Composition No. 1 are displayed in Table 1 below.

TABLE 1

| Sample | Young's Modulus | Poisson's Ratio | Ultimate Compressive Strength |
|---|---|---|---|
| Sample Composition No. 1 | 105 psi | 0.39 | 70 psi at 40% axial deformation |

EXAMPLE 3

The glass transition temperatures (Tg) for the set sample compositions from Example 1 were determined in accordance with standard industry procedures. Glass transition temperatures may be used to characterize thermoplastic and elastomeric materials. Accordingly, thermogravimetric analyses ("TGA") of the set sample compositions from Example 1 with differential scanning calorimetry ("DCS") were performed to obtain glass transition temperatures at various conditions. Accordingly, the glass transition temperature for Sample Composition No. 1 was determined to be 151.50° C., and the glass transition temperature for Sample Composition No. 2 was determined to be 162.57° C.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of forming a seal in a subterranean formation comprising:
   providing a sealing composition that comprises
      a viscous liquid polymer, and
      an unpolymerized monomer comprising a vinyl monomer or an activated vinyl monomer;
   placing the sealing composition into a desired location in the subterranean formation; and
   allowing the sealing composition to set to form a seal.

2. The method of claim 1 wherein the seal is a permanent seal.

3. The method of claim 1 further comprising contacting the sealing composition with an activator.

4. The method of claim 3 wherein contacting the sealing composition with the activator occurs prior to placing the sealing composition into the subterranean formation.

5. The method of claim 1 wherein the desired location is an annular space between a section of tubing, and a casing or a wall of a well bore that penetrates the subterranean formation.

6. The method of claim 1 further comprises applying a mechanical force to the sealing composition sufficient to activate polymerization of the sealing composition.

7. The method of claim 1 wherein the viscous liquid polymer has a molecular weight in the range of from about 1,000 to about 1,000,000.

8. The method of claim 1 wherein the viscous liquid polymer has a viscosity in the range of from about 100 centipoise to about 600 Poise.

9. The method of claim 1 wherein the viscous liquid polymer comprises polybutadiene, polybutadiene(cis), polybutadiene (epoxy/hydroxyl functionalized), polybutadiene (hydroxyl terminated), polybutadiene-graft-poly(methyl acrylate-co-acrylonitrile), polybutadiene (dicarboxy terminated), or a combination thereof.

10. The method of claim 1 wherein the viscous liquid polymer is present in the sealing composition in an amount in the range of from about 40% to about 95% by weight of the sealing compositions.

11. The method of claim 1 wherein the monomer comprises at least one derivative of acrylic acid.

12. The method of claim 1 wherein the monomer comprises acrylic acid, sodium salt of acrylic acid, 2-hydroxyethyl acrylate, an acrylamide, methylacrylamide, N,N dimethylacrylamide, n-isopropyl acrylamide, methyl methacrylate, an alkyl acrylate, an aryl acrylate, a methyl acrylate, a derivative of a methyl acrylate, or a combination thereof.

13. The method of claim 1 wherein the monomer is present in the sealing composition in an amount in the range of from about 2% to about 60% by weight of the sealing composition.

14. The method of claim 1 wherein the sealing composition further comprises a second monomer comprising more than one acrylate group.

15. The method of claim 14 wherein the second monomer comprises two acrylate groups.

16. The method of claim 1 wherein the sealing composition further comprises an organosilane compound.

17. The method of claim 16 wherein the organosilane compound comprises a mono-, a di-, a tri-, or a polyfunctional organosilane.

18. The method of claim 16 wherein the organosilane compound comprises tris(3-trimethoxysilylpropyl)isocyanurate, 3-aminopropyltrimethyoxysilane, 3-aminopropyltriethoxysilane, N-2-(aminoethyl)-3-ammopropyltriethoxysilane, 3-glycidoxy-propyltrimethoxysilane, or a combination thereof.

19. The method of claim 16 wherein the organosilane compound is present in the sealing composition in an amount in the range of from about 1% to about 40% by weight of the sealing composition.

20. The method of claim 1 wherein the sealing composition further comprises a polyfunctional crosslinker.

21. The method of claim 20 wherein the polyfunctional crosslinker comprises trimethylolpropane ethoxylate triacrylate, or tris(2-hydroxyethyl)isocyanurate triacrylate.

22. The method of claim 20 wherein the polyfunctional crosslinker is present in the sealing composition in an amount in the range of from about 2% to about 30% by weight of the sealing composition.

23. The method of claim 1 wherein the sealing composition further comprises a solid additive.

24. The method of claim 23 wherein the solid additive comprises surface-activated polybutadiene or glass particles.

25. The method of claim 23 wherein the solid additive is present in the sealing composition in an amount in the range of from about 1% to about 10% by weight of the sealing composition.

26. The method of claim 1 wherein the sealing composition further comprises an activator.

27. The method of claim 26 wherein the activator is encapsulated.

28. The method of claim 26 wherein the activator is a peroxide, a peroxy carbonate, an azide, an azo activator, or a mixture thereof.

29. The method of claim 26 wherein the activator comprises 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide, t-butyl peroxide, t-butylhydroperoxide, or a mixture thereof.

30. The method of claim 1 wherein the sealing composition further comprises a stabilization compound.

31. The method of claim 30 wherein the stabilization compound comprises monomethyl ether hydroquinone.

32. A method of forming a seal in a subterranean formation penetrated by a well bore comprising:
providing a sealing composition that comprises
a viscous liquid polymer, and
an unpolymerized monomer comprising a vinyl monomer or an activated vinyl monomer;
activating polymerization of the sealing composition;
placing the sealing composition into a desired location in the subterranean formation; and
allowing the sealing composition to polymerize to form a seal.

33. The method of claim 32 wherein activating polymerization of the sealing composition occurs prior to, subsequent to, or simultaneously with placing the sealing composition into the desired location.

34. The method of claim 32 wherein the seal is a permanent seal.

35. The method of claim 32 wherein the desired location is an annular space between a section of tubing, and a casing or a wall of the well bore.

36. The method of claim 32 wherein the viscous liquid polymer comprises polybutadiene, polybutadiene(cis), polybutadiene (epoxy/hydroxyl functionalized), polybutadiene (hydroxyl terminated), polybutadiene-graft-poly(methyl acrylate-co-acrylonitrile), polybutadiene (dicarboxy terminated), or a combination thereof.

37. The method of claim 32 wherein the monomer comprises at least one derivative of acrylic acid.

38. The method of claim 32 wherein the monomer comprises acrylic acid, sodium salt of acrylic acid, 2-hydroxyethyl acrylate, an acrylamide, methylacrylamide, N,N dimethylacrylamide, n-isopropyl acrylamide, methyl methacrylate, an alkyl acrylate, an aryl acrylate, a methyl acrylate, a derivative of a methyl acrylate, or a combination thereof.

39. The method of claim 32 wherein the sealing composition further comprises a second monomer comprising more than one acrylate group.

40. The method of claim 39 wherein the second monomer comprises two acrylate groups.

41. The method of claim 32 wherein the sealing composition further comprises an organosilane compound.

42. The method of claim 41 wherein the organosilane compound comprises a mono-, a di-, a tri-, or a polyfunctional organosilane.

43. The method of claim 41 wherein the organosilane compound comprises tris(3-trimethoxysilylpropyl)isocyanurate, 3-aminopropyltrimethyoxysilane, 3-aminopropyltriethoxysilane, N-2-(aminoethyl)-3-ammopropyltriethoxysilane, 3-glycidoxy-propyltrimethoxysilane, or a combination thereof.

44. The method of claim 32 wherein the sealing composition further comprises a polyfunctional crosslinker.

45. The method of claim 44 wherein the crosslinker comprises trimethylolpropane ethoxylate triacrylate, or tris(2-hydroxyethyl)isocyanurate triacrylate.

46. The method of claim 32 wherein the sealing composition further comprises a solid additive.

47. The method of claim 32 wherein the sealing composition further comprises an activator.

48. The method of claim 47 wherein the activator is a peroxide, a peroxy carbonate, an azide, an azo activator, or a mixture thereof.

49. The method of claim 47 wherein the activator comprises 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide, t-butyl peroxide, t-butylhydroperoxide, or a mixture thereof.

50. The method of claim 47 wherein the activator is selected to activate polymerization of the sealing composition above a preselected temperature.

51. The method of claim 47 wherein the activator is encapsulated within an encapsulating material.

52. The method of claim 51 wherein the encapsulating material is a polymeric micelle or a glass ampoule.

53. The method of claim 52 wherein the polymeric micelle or glass ampoule further contains a stabilization compound.

54. The method of claim 32 wherein the sealing composition further comprises a stabilization compound.

55. The method of claim 54 wherein the stabilization compound comprises monomethyl ether hydroquinone.

56. The method of claim 32 wherein activating polymerization of the sealing composition comprises applying a mechanical force to the sealing composition.

57. The method of claim 56 wherein applying the mechanical force to the sealing composition releases the activator that is encapsulated into the sealing composition.

58. The method of claim 32 wherein applying the mechanical force to the sealing composition comprises driving the sealing composition through a flow path with sufficient force such that the temperature of the sealing composition is raised above a temperature sufficient to activate polymerization of the sealing composition.

59. The method of claim 58 wherein the flow path comprises a pressure relief valve.

60. The method of claim 56 wherein the mechanical force is applied by an expansion or a stroke of a tool.

* * * * *